July 11, 1950 C. W. PRIBUS 2,514,669
TOGGLE REBOUND LATCH FOR PHOTOGRAPHIC SHUTTERS
Filed June 10, 1949
FIG. 1.
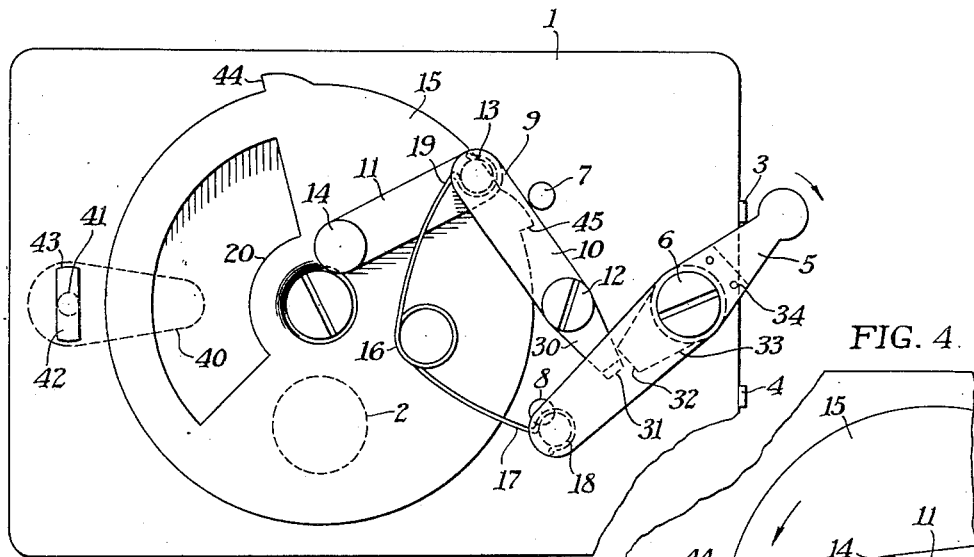
FIG. 2.
FIG. 4.
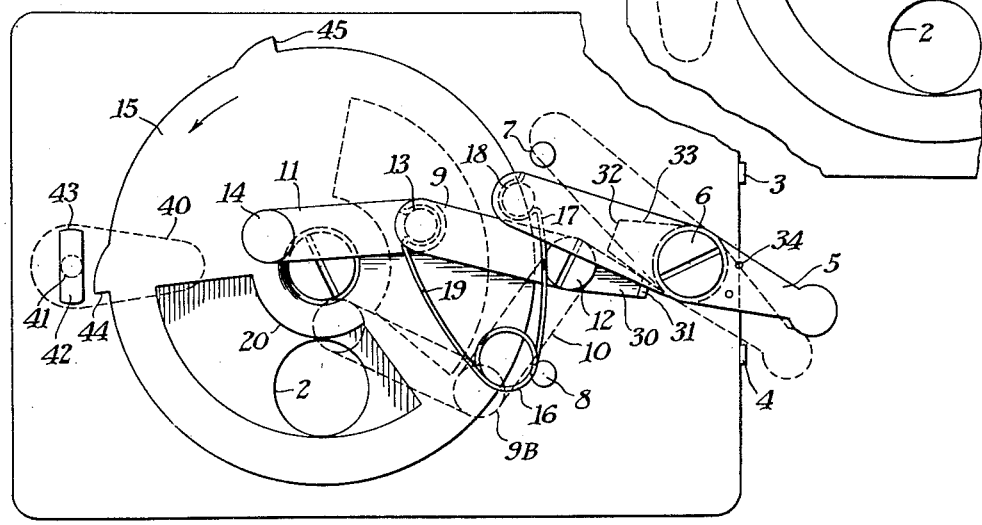
FIG. 3.
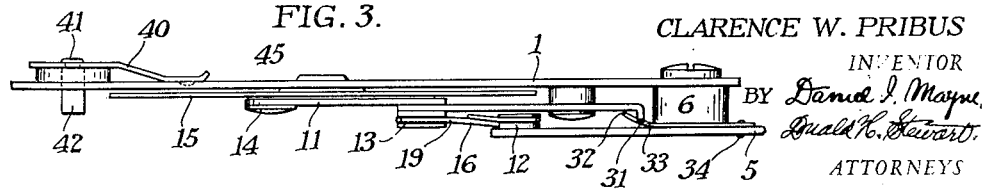
CLARENCE W. PRIBUS
INVENTOR
BY Daniel I. Mayne
Donald H. Stewart
ATTORNEYS Patented July 11, 1950

2,514,669

UNITED STATES PATENT OFFICE 2,514,669

TOGGLE REBOUND LATCH FOR PHOTOGRAPHIC SHUTTERS

Clarence W. Pribus, Rochester, N. Y., assignor to Eastman Kodak Company, Rochester, N. Y., a corporation of New Jersey Application June 10, 1949, Serial No. 98,314

5 Claims. (Cl. 95—59)

This invention relates to photography, and more particularly to a latch for preventing shutter rebound on a toggle-operated shutter. One object of my invention is to provide a simple latch element which will prevent rebound of the shutter blade in two different positions. Another object of my invention is to provide a rebound latch which will normally lie behind a second latch element but which will be removed from this position and moved to a second latching position during the operation of the trigger. A still further object of my invention is to provide a simple form of spring latch which does not materially retard the operation of the parts. Other objects will appear from the following specification, the novel features being particularly pointed out in the claims at the end thereof.

Coming now to the drawings in which like reference characters denote like parts throughout:

Fig. 1 is a rear elevation of a simple form of shutter including a rebound latch constructed in accordance with and embodying a preferred form of my invention. In this view the parts are shown in a latched position ready for an exposure to be made;

Fig. 2 is a view similar to Fig. 1 but showing the parts in the position they assume when the trigger is moved to release the shutter and after the shutter blade has moved to open the exposure aperture;

Fig. 3 is a top plan view of the shutter shown in the preceding figures; and

Fig. 4 is a fragmentary detail view showing the shutter parts in a time exposure-making position.

In most simple shutters where an oscillating or rotary shutter blade is used, the shutter blade comes against some form of stop at each end of its movement, and it frequently happens that the shutter blade tends to rebound from hitting the stops. In some instances, soft stops, such as rubber plugs, may be used, and, in some instances, other types of rebound prevention devices have been employed. In the present instance, the shutter blade is driven by a toggle and, by placing a latch element on the toggle and a latch element on the shutter trigger, these two may be made to cooperate to hold the shutter against unwanted movement at each end of its operation, utilizing only a single pair of cooperating latch elements.

More specifically, referring to the drawings, the shutter, as illustrated in Fig. 1, may consist of a support 1 having an exposure aperture 2 therein through which light passes in making an exposure. The support is provided with a pair of spaced upstanding lugs 3 and 4 between which a shutter trigger 5 may move on a stud 6 in making an exposure. There are also a pair of stop pins 7 and 8 carried by the support 1, these stop pins being for limiting the movement of a driving toggle designated broadly as 9 and consisting of a pair of toggle links 10 and 11.

The first toggle link is pivoted at 12 to the support, at 13 to the second toggle link 11 and the toggle link 11 is attached to a stud 14 carried by a shutter plate 15.

In order to drive the toggle there is a hairpin spring 16, one end of which 17 encircles a pin 18 carried by the trigger. The other end 19 encircles the stud 13 which connects the two toggle links so that when the trigger 5 is moved in the direction shown by the arrow in Fig. 1, the hairpin spring 16 is compressed, and when the pin 18 passes a dead center is released to swing the toggle links from the position shown in Fig. 1 to the position shown in broken lines at 9—B in Fig. 2. In this position, the toggle link 10 rests against the stop pin 8. For the next successive exposure the trigger must be moved in an opposite direction.

The shutter plate 15 is provided with an exposure slot 20 which is preferably elongated, as shown, so as to swing over the exposure aperture 2 when the toggle links 10 and 11 move from their angular position against one stop through a straight line position and to a second angular position in which they contact with a second stop as, for instance, from stop 7 to stop 8, as above described. It will be noticed from Fig. 1 that when the exposure is made by releasing the hairpin spring, the toggle links 10 and 11 tend to straighten out and as they reach their straight line position, almost reached in the full line showing of Fig. 2, the exposure slot 20 has uncovered the exposure aperture 2 and at this point the shutter blade 15 slows up very materially so that the exposure aperture 2 is open a relatively long period of time. The toggle links 10 and 11 must straighten out and continue to move downwardly, thereby speeding up the shutter so that by the time the exposure slot 20 closes the exposure aperture 2, the shutter is again moving at quite a rapid rate. It has been found that a highly efficient shutter (for a simple and inexpensive camera) can be made by moving the shutter blade fast, then slow, then fast again, during the exposure making movement. Such a shutter has been made with an efficiency between 75 and 80 per cent at an exposure of between 1/40 and 1/50 of a second, since these times are quite useful for cameras designed for present day film speeds. This is quite an efficient shutter and it is much more efficient than the usual type disk shutter which moves with a more or less constant velocity throughout its exposure making movement, or it may even slightly accelerate from the beginning to the end of an exposure.

However, with such a shutter, the shutter plate is moving at quite a high speed as the exposure is ended which, of course, is desirable for closing the exposure aperture too rapidly but which is undesirable from the standpoint of rebound, so that a special type of rebound prevention device has been found desirable.

It will be noticed that the toggle link 10 is provided with an extension 30 which has a turned-up finger 31, as best shown in Fig. 3. This turned-up end has a rest position behind the end 32 of a leaf spring latch 33 which may be attached to the trigger in any desired manner, such as by pins or otherwise at 34. This spring latch curves toward the upstanding finger 31 of the toggle arm 30 in its rest position shown in Fig. 1. It therefore serves as a latch for holding this end in the fixed position shown. When the trigger 5 is moved to make an exposure, the spring 32, moving with the trigger, moves through an arcuate path away from the upstanding finger 31 so that the lug will be free to move when the spring 16 is tensioned and released. In addition, since the trigger is moved with a steady motion from one stop to the other—in accordance with Fig. 1 from stop 3 to stop 4—the spring latch 32 lies in a second rest position in which it will be again engaged by the lug 32 as the toggle moves to make the exposure. In so moving, the turned-up end 31 will pass beneath the spring latch 32 and since this latch has an extremely light spring, this movement will not materially retard the movement of the toggle. It will move through a circumferential path so that it will snap behind the spring 32 where, of course, it will be held until the next exposure is made. Such a structure completely prevents any rebound of the shutter blade after an exposure has been completed because any reaction on the toggle 10 will be prevented by the latch element 32. Thus, a simple form of latch is provided which requires only the addition of the light spring 33 to the trigger 5.

If it is desired to produce a prolonged exposure, the time exposure lever 40 may be moved from the position shown in Fig. 1 to the position shown in Fig. 4. The lever 40 is carried by a shaft 41 which, in turn, carries the stop member 42. The ends 43 of the stop member may be moved into the path of the stop lugs 44 or 45 carried by the shutter blade so that when the trigger 5 is depressed the shutter blade can only swing until a lug engages the time stop 43. A reverse movement of the trigger will then move the shutter blade to its initial position and to a position in which the finger 31 will engage the spring latch 32.

While I have illustrated a preferred embodiment of my invention, it is obvious that various modifications may suggest themselves to those skilled in the art. It is therefore pointed out that the particular embodiment shown in the drawings and described herein is one which works satisfactorily in practice and is illustrative of my invention, but it is not to be considered in a limiting sense.

Having thus described my invention, what I claim is new and desire to secure by Letters Patent of the United States is:

1. A shutter comprising an apertured support, a slotted shutter blade pivotally mounted thereon and normally overlying said aperture with the slot adapted to uncover the aperture when the shutter moves, a pivotally mounted trigger, a toggle comprising two links pivoted together, one link pivotally attached to the shutter and the other pivotally attached to the support, a spring connecting the toggle to the trigger to be tensioned thereby by moving the trigger for moving the toggle, a spring latch carried by the trigger, a finger carried by a toggle link and engageable with the spring latch as the toggle moves to complete an exposure.

2. A shutter as defined in claim 1 characterized by the trigger being mounted on a stud spaced from the pivotal support for the toggle whereby the spring latch may be moved away from the finger as an exposure is started by moving the trigger manually.

3. A shutter comprising an apertured support, a slotted shutter blade pivotally mounted thereon and normally overlying said aperture with the slot adapted to uncover the aperture when the shutter moves, a pivotally mounted trigger, a toggle comprising two links pivoted together, one link pivotally attached to the shutter and the other pivotally attached to the support, a spring connecting the toggle to the trigger to be tensioned thereby by moving the trigger for moving the toggle, a spring latch carried by the trigger, a finger carried by a toggle link and engageable with the spring latch as the toggle moves to complete an exposure, said spring latch comprising a spring member connected to the trigger adjacent the pivotal mount thereof, and having a latching end extending away from the trigger, the said finger including a projection shaped to engage and snap under the latching end of the spring member as the toggle moves to a rest position in which the links of the toggle lie in an angular position with respect to each other.

4. A shutter comprising an apertured support, a slotted shutter blade pivotally mounted thereon and normally overlying said aperture with the slot adapted to uncover the aperture when the shutter moves, a pivotally mounted trigger, a toggle comprising two links pivoted together, one link pivotally attached to the shutter and the other pivotally attached to the support, a spring connecting the toggle to the trigger to be tensioned thereby by moving the trigger for moving the toggle, a spring latch carried by the trigger, a finger carried by a toggle link and engageable with the spring latch as the toggle moves to complete an exposure, said spring latch comprising a spring member connected to the trigger adjacent the pivotal mount thereof, and having a latching end extending away from the trigger, the said finger including a projection shaped to engage and snap under the latching end of the spring member as the toggle moves to a rest position in which the links of the toggle lie in an angular position with respect to each other, said trigger being movable through approximately 90° in making an exposure and engaging the projection on the toggle finger at substantially right angles thereto whereby the first part of the trigger movement in making an exposure may cause the spring member to move away from the projection on the finger in moving through an arc about the trigger pivot to release the latch before operating the toggle.

5. A shutter blade comprising an apertured support, a slotted shutter blade pivotally mounted thereon and normally overlying said aperture with the slot adapted to uncover the aperture when the shutter moves, a pivotally mounted trigger, a toggle comprising two links pivoted together, one link pivotally attached to the shutter and the other pivotally attached to the support, a spring connecting the toggle to the trigger to be tensioned thereby by moving the trigger for moving the toggle, a spring latch carried by the trigger, a finger carried by a toggle link and engageable with the spring latch as the toggle moves to complete an exposure, said spring latch comprising a spring member connected to the trigger adjacent the pivotal mount thereof, and having a latching end extending away from the trigger, the said finger including a projection shaped to engage and snap under the latching end of the spring member as the toggle moves to a rest position in which the links of the toggle lie in an angular position with respect to each other, said trigger being movable through approximately 90° in making an exposure and engaging the projection on the toggle finger at substantially right angles thereto whereby the first part of the trigger movement in making an exposure may cause the spring member to move away from the projection on the finger in moving through an arc about the trigger pivot to release the latch before operating the toggle, said spring latch element carried by the trigger also being moved by the trigger to a second operative position in tensioning and releasing the shutter in which it may be in position to again engage and latch the projection on the finger as the latter moves to complete an exposure.

CLARENCE W. PRIBUS.

No references cited.